(12) United States Patent
Yang

(10) Patent No.: US 8,295,335 B2
(45) Date of Patent: Oct. 23, 2012

(54) TECHNIQUES TO CONTROL UPLINK POWER

(75) Inventor: Rongzhen Yang, Shangai (CN)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 12/782,800

(22) Filed: May 19, 2010

(65) Prior Publication Data

US 2011/0158304 A1    Jun. 30, 2011

Related U.S. Application Data

(60) Provisional application No. 61/291,787, filed on Dec. 31, 2009.

(51) Int. Cl.
*H04B 1/38* (2006.01)

(52) U.S. Cl. ........ 375/219; 375/227; 375/260; 375/262; 375/267; 375/285; 375/295; 375/316

(58) Field of Classification Search ............... 375/219, 375/260, 262, 267, 222, 285, 295, 316; 370/203, 370/204, 205, 208, 209, 210
See application file for complete search history.

(56) References Cited

U.S. PATENT DOCUMENTS

2007/0191050 A1* 8/2007 Chang et al. .............. 455/522
2010/0202372 A1* 8/2010 Chun et al. ................. 370/329

OTHER PUBLICATIONS

IEEE 802.16m/D3, "Part 16: Air Interface for Fixed and Mobile Broadband Wireless Access Systems," Advanced Air Interface, Draft Amendment to IEEE Standard for Local Metropolitan Area Networks, IEEE Computer Society and the IEEE Microwave Theory and Techniques Society, Dec. 2009, New York, New York, pp. 526-528.
IEEE 802.16m/D3, "Part 16: Air Interface for Fixed and Mobile Broadband Wireless Access Systems," Advanced Air Interface, Draft Amendment to IEEE Standard for Local Metropolitan Area Networks, IEEE Computer Society and the IEEE Microwave Theory and Techniques Society, Dec. 2009, New York, New York, pp. 560-564.

* cited by examiner

*Primary Examiner* — Dhaval Patel
(74) *Attorney, Agent, or Firm* — Schwabe, Williamson & Wyatt, P.C.

(57) ABSTRACT

Techniques are described that provide uplink power control techniques that can support different uplink multi-input multi-output (MIMO) transmission schemes. A mobile station determines a Signal to Interference-plus-Noise Ratio based on base and offset values transmitted from a base station. The base station can transmit the base and offset values using seven bits total. The mobile station determines an uplink transmitter power level based on the Signal to Interference-plus-Noise Ratio.

19 Claims, 4 Drawing Sheets

TECHNIQUES TO CONTROL UPLINK POWER

RELATED APPLICATION

This application claims the benefit of U.S. Provisional Application No. 61/291,787, filed Dec. 31, 2009.

FIELD

The subject matter disclosed herein relates generally to techniques to determine power level of a transmitted wireless signal.

RELATED ART

In wireless networks, Orthogonal FDM (OFDM)/Orthogonal Frequency Division Multiple Access (OFDMA) with multi-input multi-output (MIMO) are important technologies for next-generation mobile broadband networks. Uplink power control is an extremely important component of OFDM/OFDMA with MIMO. Uplink power control involves controlling the transmit power level to balance the link performance and terminal battery power and to reduce the inter-base station uplink co-channel interference. Increasing transmission power of one mobile station enjoys the increase of its link performance but increases interferences to other mobile stations of neighboring base stations because they use the same channel. This results in decreased link performance of the other mobile stations. Therefore, in deciding uplink power level, it is important to balance the performance of a particular link with interference to the other base stations.

Section 16.3.9.2.1.2 of IEEE 802.16m Draft Standard D5 (2010) defines a secondary fast feedback control channel (SFBCH) used by an Advanced Mobile Station (AMS) to feedback channel information and MIMO mode selection to an Advanced Base Station (ABS) (defined in 16.3.9.3.1.2 of IEEE 802.16m Draft Standard (D5) (2010)). Section 16.3.9.2.1.2 of IEEE 802.16m defines use of eighteen (18) levels to carry the different payload information. In some cases, eighteen (18) different control parameters are broadcast from an ABS to control the SFBCH uplink transmission power. However, using eighteen (18) different control parameters would introduce too large an overhead. It is desirable to minimize bandwidth used to transmit the control parameters and yet provide acceptable accuracy of power control.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
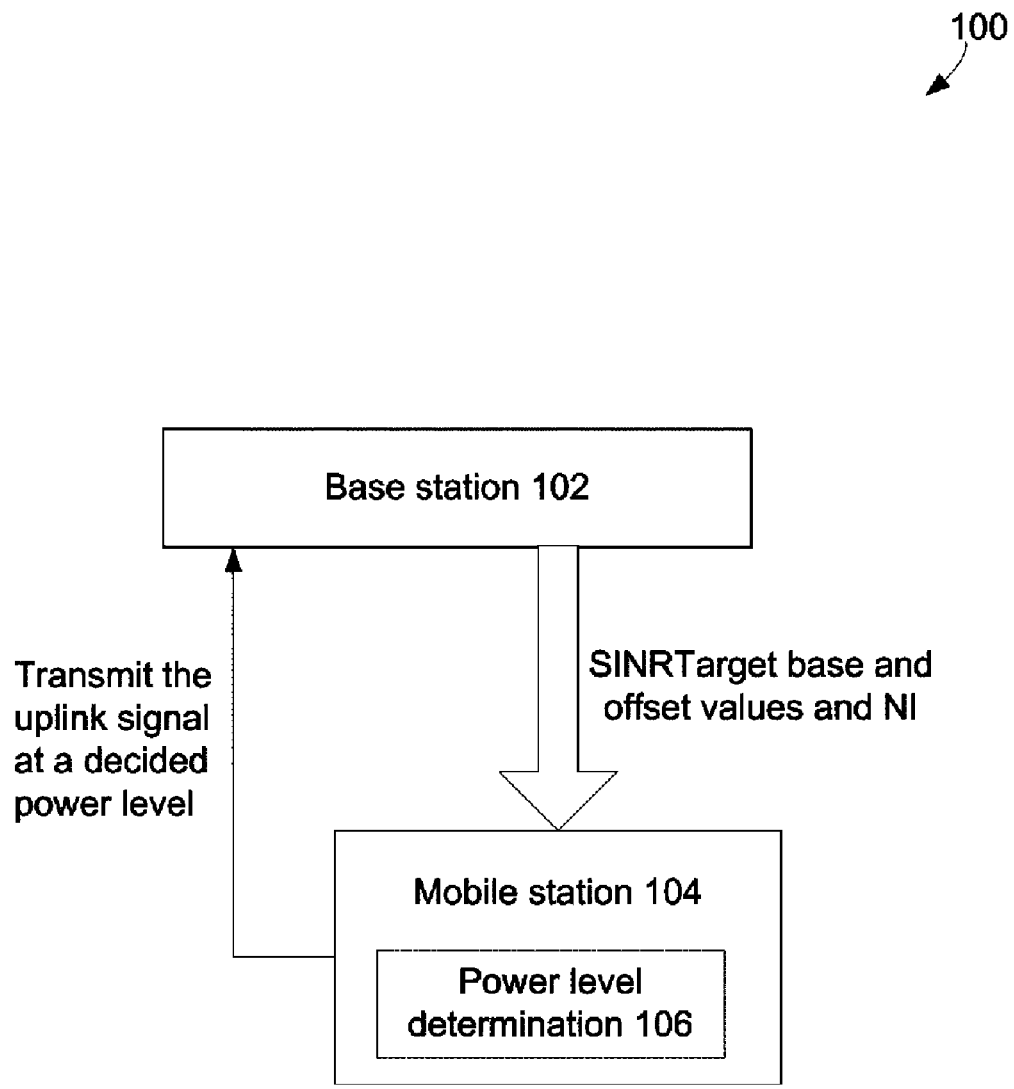
FIG. 1 depicts in block diagram form, an information exchange between a base station and mobile station for determining transmitter power level.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing™, Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to IEEE 802.11a, 802.11b, 802.11e, 802.11g, 802.11h, 802.11i, and 802.11n as well as any version or draft of IEEE 802.16e and IEEE 802.16m.

Various embodiments provide a design which uses two input parameters to generate eighteen (18) different control parameters. In some embodiments, seven (7) bits are used to transmit the input parameters. The input parameters can be broadcast in message AAI_SCD, which is described in section 16.2.3.30 of IEEE 802.16m Draft Standard (D5) (2010). The input parameters can be used to determine a Signal to Interference-plus-Noise Ratio. In turn, the Signal to Interference-plus-Noise Ratio can be used to determine uplink transmitter power.

FIG. 1 depicts in block diagram form, an information exchange between a base station and mobile station for determining transmitter power level. In various embodiments, mobile station 104 includes power level determination logic 106 to determine its own uplink transmission power level to base station 102. Although not depicted, each of base station 102 and mobile station 104 include MAC layer logic to process MAC layer messages. For example, in some cases, power level determination logic 106 determines the uplink power level to base station 102 using equation (1) below. IEEE 802.16m uplink transmission power per subcarrier and per stream is calculated by equation (290) from IEEE 802.16m draft 5 (2010):

$$P(dBm)=L+SINR_{Target}+NI+Offset \quad (1)$$

where:
P is the TX power level (dBm) per stream and per subcarrier for the current transmission from the mobile station to the base station.
L is the estimated average current downlink propagation loss calculated by AMS. It shall include AMS's Tx antenna gain and path loss. L can be determined using the following expression:
L=ABS_Tx_Power−downlink received signal strength measured by the AMS.
In some cases, the ABS can request that the AMS transmit the L to the ABS in a manner described in section 16.3.9.4.7 of IEEE 802.16.m draft D5 (2010).
$SINR_{Target}$ is the target uplink Signal to Interference-plus-Noise Ratio.
NI is the estimated average power level (dBm) of the noise and interference per subcarrier at the ABS, not including ABS's Rx antenna gain, which is transmitted to the AMS via the AAI_ULPC_NI message. AAI_ULPC_NI message is a MAC control message defined in Section 16.2.3 of IEEE 802.16m draft D5 (2010). Broadcast of the NI is defined in section 16.2.3.31 of IEEE 802.16m draft D5 (2010).
Offset is a correction term for AMS-specific power offset. It is controlled by the ABS through power control messages. There are two kinds of Offset values that are used for different channels separately, namely $Offset_{Data}$ and $Offset_{Control}$. Unicast of the Offset is defined in section 16.2.3.32 of IEEE 802.16m draft D5 (2010).

$SINR_{Target}$ in equation (1) for secondary fast feedback channels can be determined by an AMS using the following expression:

$$SINR_{Target}(SFBCH)=SFBCH_{Base}+(l-l_{min})\times SFBCH_{Delta} \quad (2)$$

where,
$SFBCH_{Base}$ is a base $SINR_{Target}$ value signaled by attribute targetSfbchBaseSinr of message AAI_SCD. Message AAI_SCD is a MAC control message defined in Section 16.2.3 of IEEE 802.16m draft D5 (2010).
$SFBCH_{Delta}$ is a differential $SINR_{Target}$ value signaled by attribute targetSfbchDeltaSinr of MAC control message AAI_SCD.
l is an S-FBCH payload information bits number defined in section 16.3.9.2.1.2 of IEEE 802.16m draft D5 (2010). In that section, the l value can be between seven (7) and twenty-four (24) bits, a total of 18 levels. Information bits can be used to report information from an AMS to an ABS.
$l_{min}$ is minimum S-FBCH payload information bits number defined in section 16.3.9.2.1.2 of IEEE 802.16m (2010), which is seven (7).

For secondary fast feedback channels, attributes targetSfbchBaseSinr and targetSfbchDeltaSinr in message AAI_SCD define respective parameters $SFBCH_{Base}$ and $SFBCH_{Delta}$. In various embodiments, $SFBCH_{Base}$ and $SFBCH_{Delta}$ are defined as follows:
$SFBCH_{Base}$ is 4 bits and can represent $\{-4.5, -4, -3.5, -3, -2.5, -2, -1.5, -1, -0.5, 0, 0.5, 1, 1.5, 2, 2.5, 3\}$ dB, although other values can be used. A default value of $SFBCH_{Base}$ is 1.5 dB. In some cases, $SFBCH_{Base}$ can represent $\{0, 0.5, 1, 1.5, 2, 2.5, 3, 3.5, 4, 4.5, 5, 5.5, 6, 6.5, 7, 7.5\}$ dB, with a default value of 1.5 dB.
$SFBCH_{Delta}$ is 3 bits and can represent $\{0, 0.20, 0.21, 0.22, 0.23, 0.24, 0.25, 0.26\}$ dB, although other values can be used. A default value of $SFBCH_{Delta}$ is 0.24 dB.
A default value can be the value used by mobile station 104 when it does not receive $SFBCH_{Base}$ or $SFBCH_{Delta}$ from base station 102. Accordingly, Signal to Interference-plus-Noise Ratio can range from −4.5 to 3.26 using merely seven (7) bits to transmit both $SFBCH_{Base}$ and $SFBCH_{Delta}$.

Value l is an input to equation (2). Value l can be set as any of 7-24, for a total of 18 levels. By using 7 bits input of SFBCHbase and SFBCHdelta to equation (2), 18 different SINRtarget(SFBCH) can be obtained to support 18 levels for the SFBCH channel.

Various embodiments provide a good tradeoff between the flexibility and signaling overhead. In the link level simulation (LLS) result, the following results occurred.

TABLE 1

SNR per Data Tone for a Target Packet Error Rate of 1%
PB3, VA120, and VA350 are defined using an ITU channel model for evaluation purposes.

| | Information bits size | | | |
|---|---|---|---|---|
| | 7 bits | 12 bits | 24 bits | $SFBCH_{Delta}$ |
| PB3 | 1.5 dB | 2.7 dB | 5.7 dB | 0.247 dB |
| VA120 | 3.1 dB | 4.1 dB | 7.1 dB | 0.235 dB |
| VA350 | 3.5 dB | 4.4 dB | 7.4 dB | 0.230 dB |

PB3 represents a simulation of a Mobile Station at the speed of 3 km/h;
VA120 represents a simulation of a Mobile Station in a vehicle speed of 120 km/h; and
VA350 represents a simulation of a Mobile Station in a vehicle speed of 350 km/h.

Figure 2:
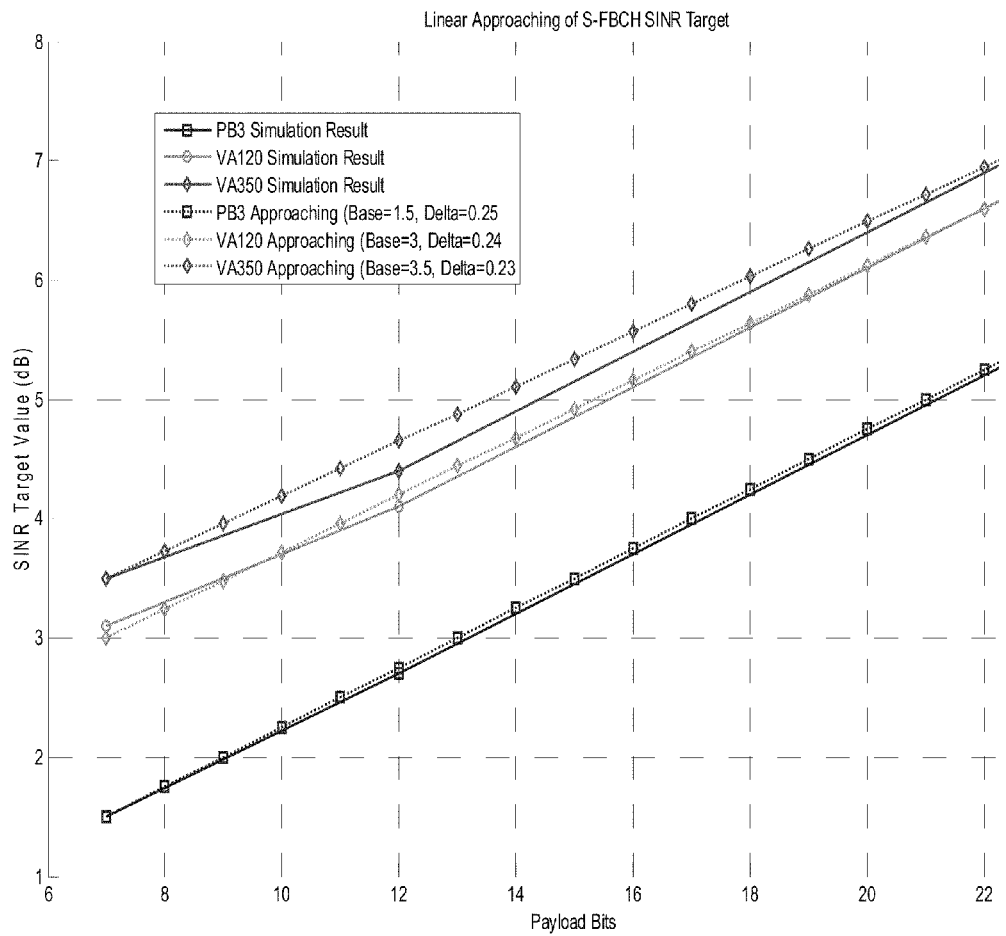
FIG. 2 depicts an example of simulation results.

FIG. 2 depicts an example of simulation results for the parameters of table 1. Based on the simulation results, various embodiments can support 18 level rates of SFBCH uplink transmission power control with only 7 bits signaling in AAI_SCD. By using two input parameters, linearity is approached for the SFBCH SINR target value. The solid lines are link level simulation results of upper conditions for PB3, VA120, and VA350 using equation (2). In the different simulation conditions, equation (2) can generate an approximately matched result to cover the link level simulation result. The start point difference, SFBCHBase, can be compensated by use of the offset value that is specific for each mobile station.

Figure 3:
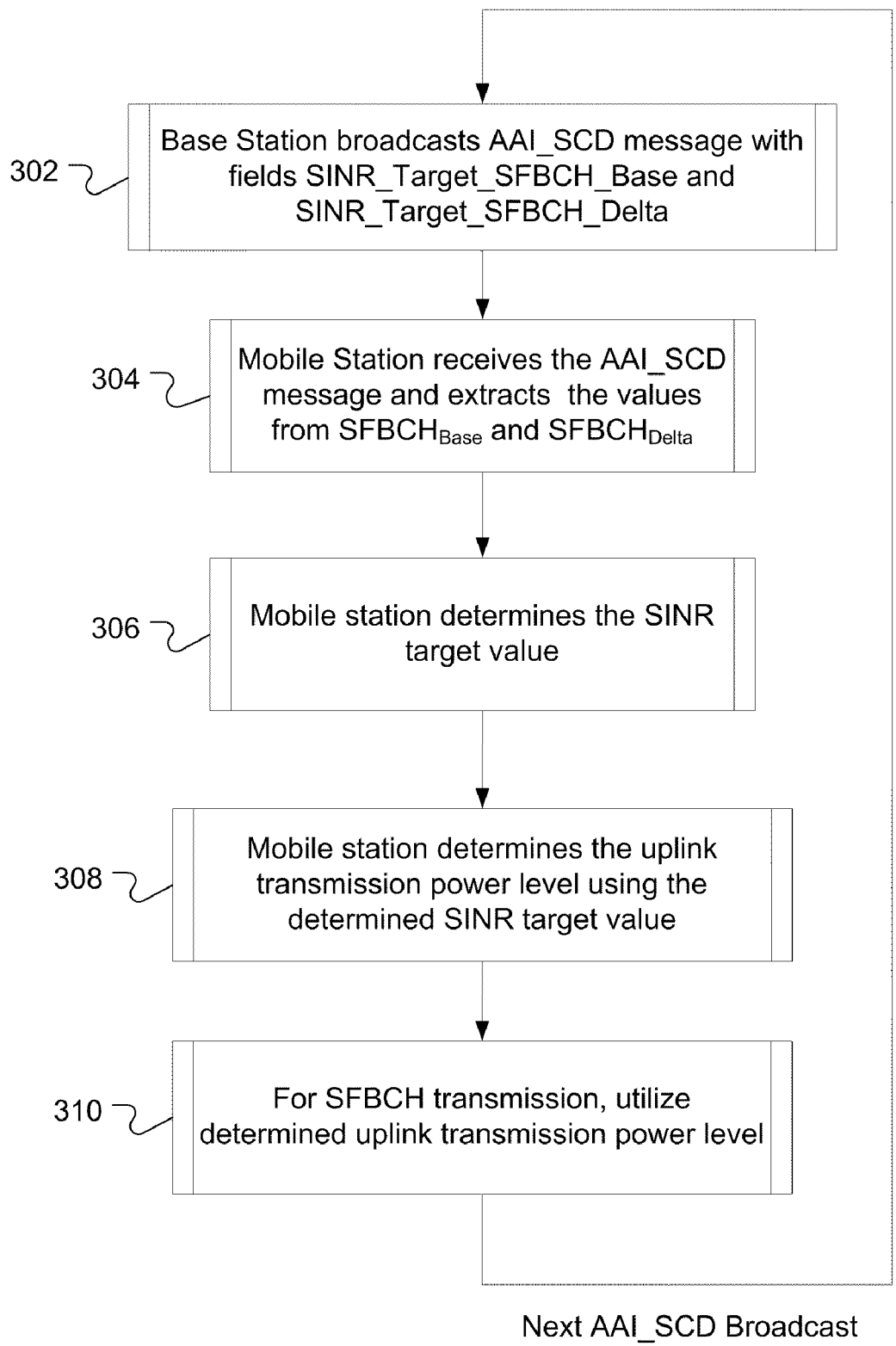
FIG. 3 depicts an example process in accordance with an embodiment.

FIG. 3 depicts an example process in accordance with an embodiment.

Block 302 includes a base station broadcasting an AAI_SCD message with fields SINR_Target_SFBCH_Base and SINR_Target_SFBCH_Delta to a mobile station. Fields SINR_Target_SFBCH_Base and SINR_Target_SFBCH_Delta respectively indicate a base $SINR_{Target}$ value and differential $SINR_{Target}$ value. The AAI_SCD is described in Section 16.2.3.30 of IEEE 802.16m draft 5 (2010). In addition, noise and interference and offset values are transmitted to the mobile station.

Block 304 includes a mobile station receiving the AAI_SCD message and extracting the base and differential values. Also, the mobile station receives the noise and interference and offset values.

Block 306 includes the mobile station determining the SINR target value using the extracted the base and differential values.

Block 308 includes the mobile station determining the uplink power based on the determined SINR target value as well as the received noise and interference and offset information.

Block 310 includes the mobile station applying the determined uplink transmission power level in the SFBCH transmissions. Thereafter, the mobile station applies the determined uplink transmission power level until it receives different base and differential values for the SINR target value.

Figure 4:
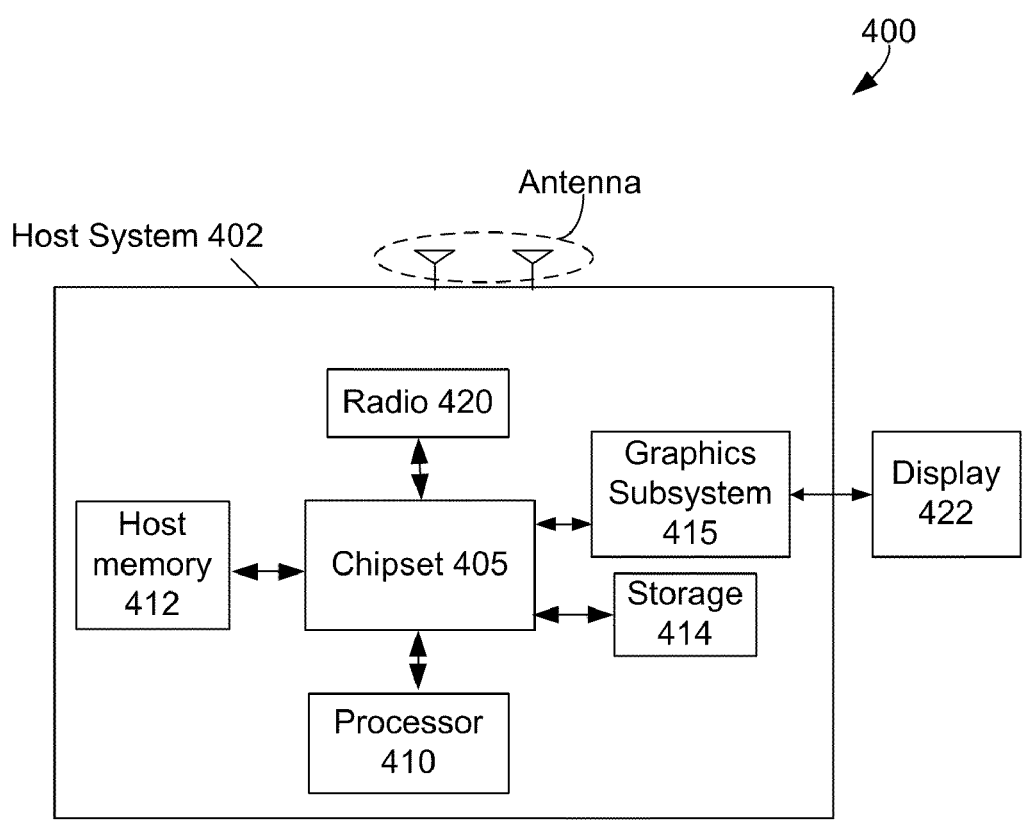
FIG. 4 depicts an example system that can use embodiments of the present invention.

FIG. 4 depicts an example system that can use embodiments of the present invention. Computer system 400 may include host system 402 and display 422. Computer system 400 can be implemented in a handheld personal computer, mobile telephone, set top box, or any computing device. Host system 402 may include chipset 405, processor 410, host memory 412, storage 414, graphics subsystem 415, and radio 420. Chipset 405 may provide intercommunication among processor 410, host memory 412, storage 414, graphics subsystem 415, and radio 420. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit. In various embodiments, processor 410 performs instructions that determine uplink power to transmit signals to a base station based on techniques described herein.

Host memory 412 may be implemented as a volatile memory device such as but not limited to a Random Access Memory (RAM), Dynamic Random Access Memory (DRAM), or Static RAM (SRAM). Storage 414 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 415 may perform processing of images such as still or video for display. An analog or digital interface may be used to communicatively couple graphics subsystem 415 and display 422. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

Radio 420 may include one or more radios capable of transmitting and receiving signals in accordance with applicable wireless standards such as but not limited to any version of IEEE 802.11 and IEEE 802.16. For example, radio 420 may include at least a physical layer interface and media access controller.

In other embodiments, a base station can determine the uplink power level and command the mobile station to transmit at the determined power level.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
receiving, by a mobile station, delta and base Signal to Interference-plus-Noise Ratio (SINR) values in a media access control (MAC) message;
determining, by the mobile station, a target SINR for a secondary fast feedback control channel (SFBCH) based on received delta and base SINR values;
determining an uplink power level based in part on the target SINR; and
transmitting signals at the determined uplink power level.

2. The method of claim 1, wherein the determining an uplink power level comprises determining:
$P(dBm) = L + SINR_{Target} + NI + Offset$, where
L comprises an estimated average current downlink propagation loss;
$SINR_{Target}$ comprises the determined target SINR;
NI comprises an estimated average power level (dBm) of the noise and interference per subcarrier at a base station; and
Offset comprises a correction term for power offset.

3. The method of claim 2, wherein the determining an uplink power level comprises determining:

$SINR_{Target}$(secondary fast feedback control channel (SFBCH))=$SFBCH_{Base}$+(l−l$_{min}$)×$SFBCH_{Delta}$ where, $SFBCH_{Base}$ comprises the received base SINR value, $SFBCH_{Delta}$ comprises the received delta SINR value, l comprises a number of payload information bits in SFBCH, and l$_{min}$ comprises a minimum number of SFBCH payload information bits.

4. The method of claim 3, further comprising:

receiving $SFBCH_{Base}$ via attribute targetSfbchBaseSinr of message advanced air interface-system configuration descriptor (AAI_SCD) and receiving $SFBCH_{Delta}$ via attribute targetSfbchDeltaSinr of message AAI_SCD.

5. The method of claim 1, wherein a total number of bits in the received delta and base SINR values comprises seven (7) bits.

6. The method of claim 1, wherein the base SINR value comprises four (4) bits and the delta SINR value comprises three (3) bits.

7. A method comprising:

transmitting to a mobile station base and delta Signal to Interference-plus-Noise Ratio (SINR) values used to determine a target SINR in a media access control (MAC) control message;

transmitting to a mobile station noise and interference per subcarrier and a correction term for power offset; and receiving, through a secondary fast feedback control channel (SFBCH), a signal from the mobile station having a power level based in part on the transmitted base and delta SINR values, noise and interference per subcarrier, and the correction term for power offset.

8. The method of claim 7, wherein the base SINR value comprises four (4) bits and the delta value comprises three (3) bits.

9. The method of claim 7, further comprising:

transmitting the base SINR value via attribute targetSfbchBaseSinr of message advanced air interface-system configuration descriptor (AAI_SCD); and transmitting the delta SINR value via attribute targetSfbchDeltaSinr of message AAI_SCD.

10. A mobile station comprising:

a radio to receive base and delta Signal to Interference-plus-Noise Ratio (SINR) values and a correction term for power offset; and power level determination logic to:

determine a target SINR value for a secondary fast feedback control channel (SFBCH) based in part on the received base and delta SINR values; and determine uplink power level based on the target SINR value and the correction term.

11. The mobile station of claim 10, wherein to determine uplink power level, the power level determination logic is to determine:

P(dBm)=L+$SINR_{Target}$+NI+Offset, where

L comprises an estimated average current downlink propagation loss;

$SINR_{Target}$ comprises the determined target SINR;

NI comprises an estimated average power level (dBm) of the noise and interference per subcarrier at a base station; and Offset comprises the correction term.

12. The mobile station of claim 11, wherein to determine the power level determination logic is to determine:

$SINR_{Target}$ (secondary fast feedback control channel (SFBCH))=$SFBCH_{Base}$+(l−l$_{min}$)×$SFBCH_{Delta}$ where, $SFBCH_{Base}$ comprises the received base value, $SFBCH_{Delta}$ comprises the received delta value, l comprises a number of payload information bits in SFBCH, and l$_{min}$ comprises a minimum number of SFBCH payload information bits.

13. The mobile station of claim 10, wherein the radio is to:

receive the base SINR value via attribute targetSfbchBaseSinr of message advanced air interface-system configuration descriptor (AAI_SCD); and receive the delta SINR value via attribute targetSfbchDeltaSinr of message AAI_SCD.

14. The mobile station of claim 10, wherein the base SINR value comprises four (4) bits and the delta SINR value comprises three (3) bits.

15. A system comprising:

a display device;

a radio; and a processor configured to:

determine uplink power level based in part on received base and delta Signal to Interference-plus-Noise Ratio (SINR) values received from a base station, wherein to determine uplink power level, the processor is to determine:

P(dBm)=L+$SINR_{Target}$+NI+Offset, wherein

L comprises an estimated average current downlink propagation loss;

$SINR_{Target}$ comprises a target SINR value;

NI comprises an estimated average power level (dBm) of noise and interference per subcarrier at the base station; and Offset comprises a correction term for power offset.

16. The system of claim 15, wherein to determine the target SINR value, the processor is to determine:

$SINR_{Target}$ (secondary fast feedback control channel (SFBCH))=$SFBCH_{Base}$+(l−l$_{min}$)×$SFBCH_{Delta}$ where, $SFBCH_{Base}$ comprises the received base SINR value, $SFBCH_{Delta}$ comprises the received delta SINR value, l comprises a number of payload information bits in SFBCH, and l$_{min}$ comprises a minimum number of SFBCH payload information bits.

17. The system of claim 15, wherein the radio is to:

receive the base SINR value via attribute targetSfbchBaseSinr of message advanced air interface-system configuration descriptor (AAI_SCD); and receive the delta SINR value via attribute targetSfbchDeltaSinr of message AAI_SCD.

18. The system of claim 15, wherein the base SINR value comprises four (4) bits and the delta SINR value comprises three (3) bits.

19. The system of claim 15, wherein a total of bits for the base SINR value and the delta SINR value comprises seven (7) bits.

* * * * *

UNITED STATES PATENT AND TRADEMARK OFFICE
CERTIFICATE OF CORRECTION

PATENT NO.       : 8,295,335 B2
APPLICATION NO.  : 12/782800
DATED            : October 23, 2012
INVENTOR(S)      : Yang Page 1 of 1

It is certified that error appears in the above-identified patent and that said Letters Patent is hereby corrected as shown below:

In the Claims

Column 8

Lines 1-2, "...wherein to determine the power level determination logic is to determine:..."
should read --...wherein to determine the target SINR, the power level determination logic is to determine:...--.

Signed and Sealed this
Seventeenth Day of February, 2015

Michelle K. Lee
*Deputy Director of the United States Patent and Trademark Office*